July 5, 1960   A. KURTI   2,943,449
BYPASS ENGINE WITH FLEXIBLE DUCT STRUCTURE
Filed July 7, 1958

INVENTOR
ALEXANDER KURTI
BY Vernon F. Hauschild
ATTORNEY

United States Patent Office 2,943,449
Patented July 5, 1960

2,943,449

BYPASS ENGINE WITH FLEXIBLE DUCT STRUCTURE

Alexander Kurti, Wethersfield, Conn., assignor to United Aircraft Corporation, East Hartford, Conn., a corporation of Delaware Filed July 7, 1958, Ser. No. 746,971

3 Claims. (Cl. 60—39.32)

This invention relates to bypass flow engines and more particularly to the structure of the bypass ducting.

It is an object of this invention to teach bypass ducting for a bypass flow engine with provisions for accommodating axial and radial misalignments between the concentric cases forming a bypass passage around the engine, which misalignment is caused by machining tolerances and relative thermal expansion between parts during engine operation.

It is a further object to teach the diminution of stresses due to axial thermal differential expansion.

It is still a further object of this invention to teach misalignment accommodating means between two concentric rigid cases defining a frusto-conical annular passage, comprising the use of a frusto-conical floating sleeve with cylindrical end surfaces mating with corresponding surfaces which define an interruption in one of the rigid cases.

Other objects and advantages will be apparent from the specification and claims, and from the accompanying drawings which illustrate an embodiment of the invention.

Figure 1:
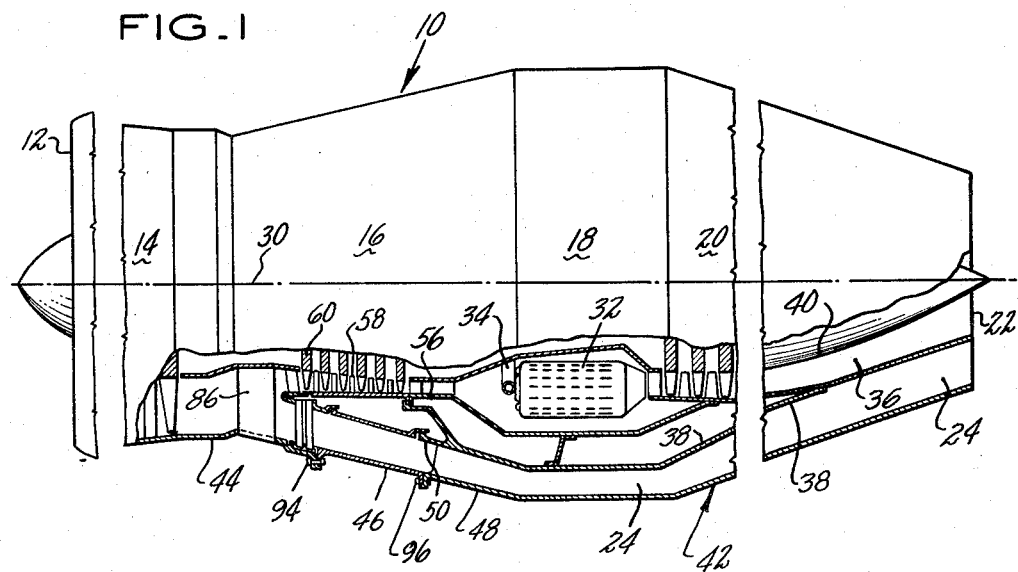
Fig. 1 is a side view of a bypass engine, broken away in part, to illustrate the environment of my misalignment accommodation means.

Fig. 1 shows bypass engine 10, which may be of the ducted fan type fully described in United States Patents Nos. 2,458,600; 2,610,465; and 2,753,685. Engine 10 comprises air inlet section 12, fan section 14, compressor section 16, burner section 18, turbine section 20, exhaust outlet section 22 and bypass passage 24, all of which are concentric about engine axis 30. Turbine 20 may be split so that certain rotors thereof drive fan 14 and other rotors thereof drive compressor 16. The air which enters engine inlet 12 is compressed in passing through fan 14 and passes by one of two possible paths to exhaust outlet section 22. A portion of the air leaving fan section 14 will pass through compressor section 16 where it is further compressed, then through burner section 18 where it is heated due to the combustion taking place in combustion chambers 32 which receive fuel from fuel manifold 34, then through turbine section 20 wherein energy is extracted therefrom to drive compressor 16 in fan 14, and thence through exhaust gas passage 36 to be discharged to atmosphere through exhaust outlet 22 to perform a thrust generating function. The remainder of the air from fan 14 passes through bypass passage 24 which directs the air from fan 14 around compressor 16, burner 18, turbine 20 and discharges it to atmosphere through exhaust outlet 22 to perform a thrust generating function.

Engine inner case, duct or shell 38 is of circular cross section and concentric about axis 30 and envelops compressor section 16, burner section 18, turbine section 20 and coacts with stationary inner body 40, which is preferably of conical shape and projects downstream of turbine 20 concentrically about axis 30, to define annular exhaust gas passage 36. Engine outer case, duct or shell 42 is also of circular cross section and concentric about axis 30 and envelops fan 14 and engine inner case 38 and coacts with engine inner case to define annular bypass passage 24 which communicates with engine fan 14 and exhaust outlet section 22. Both engine inner case 38 and engine outer case 42 are of rigid construction and preferably composed of a plurality of abutting and solidly joined case sections, such as 44, 46 and 48 of Fig. 2, and are of extensive dimension in both an axial and radial direction. Accordingly, any machining tolerances in the solidly joined case sections and any tolerance buildup which occurs in assembling the various solidly joined case sections in assembling engine inner case 38 and engine outer case 42, together with the relative thermal expansion which will occur between inner case 38 and outer case 42 during engine operation, present alignment and matching problems, between engine inner case 38 and engine outer case 42, of both an axial and radial nature. The thermal expansion problem is particularly acute since the inner case 38 is positioned adjacent compressor section 16 and burner section 18, which operate at high temperature, while outer duct 42 is cooled not only by the ambient air external thereof but also by the air from fan 14 which passes adjacent thereto in bypass passage 24.

It will be noted that inner case 38 has a frusto-conical portion 50 at its upstream end and that outer case 42 has a frusto-conical portion 52 enveloping radially aligned and concentric therewith so that frusto-conical portions 50 and 52 form a frusto-conical annular passage therebetween.

Figure 2:
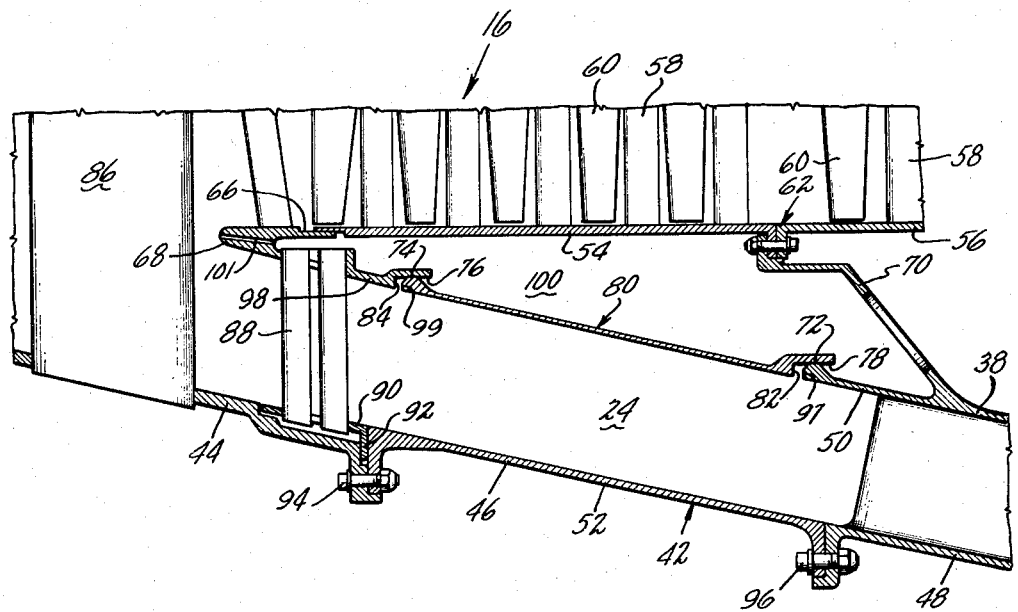
Fig. 2 is an enlarged view of a portion of the bypass engine illustrated in Fig. 1 and showing my invention with greater particularity.

Referring to Fig. 2 we see that cylindrical shroud structures 54 and 56 surround compressor section 16 and carry the stationary vanes 58 thereof between the rotating bladed rotors 60 thereof. Shrouds 54 and 56 are joined by mating flanges at connection 62, while the upstream end of shroud 54 is piloted in axially sliding engagement on cylindrical surface 66 adjacent the leading edge 68 of inner case 38. The frusto-conical portion 50 of inner case 38 is shown in Fig. 2 to be joined at connection 62 to cylindrical shrouds 54 and 56, through support 70. This support is designed so as to permit radial thermal growth to inner structure. The front end of the frusto-conical portion 50 of rigid inner case 38 is defined by radial plane surface 97 and cylindrical surfaces 72 on which axial and radial end surfaces 78 and 82 of frusto-conical floating sleeve 80 are received in a similar manner plane radial surface 84 and cylindrical surface 76 of the frusto-conical front structure 98 receive axial and radial surfaces 99 and 74 of frusto-conical floating sleeve 80. It will be noted that cylindrical end surfaces 76 and 78 of sleeve 80 are axially and radially spaced as are the corresponding cylindrical end surfaces 74 and 72 of rigid portion 50, with which they mate. Sleeve 80 is thus axially and radially movable with respect to rigid frusto-conical portion 50 which includes member 98. Shoulders 82 and 84 limit the axial movement permitted between sleeve 80 and inner case 38. Outer case 42 is a load-carrying member and supports the engine diffuser and a bearing (not shown) between fan 14 and compressor 16 through a plurality of circumferentially equally spaced and radially extending struts 86, which project from and are supported by outer case 42 and position the diffuser structure with a bearing unit. A plurality of equally circumferentially spaced and radially directed turning vanes 88 extend between and are connected to inner case 38 and outer case 42 and serve to straighten the direction of the flow of air passing through bypass passage 24 by removing therefrom the swirling action imparted thereto by rotating fan 14. Outer shroud 90 of straightening vanes 88 carry radially projecting flange 92 which is sized by machining to precisely fill the gap between outer case sections 44 and 46. Connecting means such as bolt and flange units 94 and 96 connect outer case sections 44, 46 and 48 in a mating flange connection as best shown in Fig. 2. Once the plurality of outer case sections such as 44, 46 and 48 are solidly joined by such means as nut and bolt units 94 and 96, outer case 42 becomes a rigid structure while inner case 38 also becomes a rigid structure but with an interruption therein which is filed by axially and radially movable floating sleeve 80. It will be apparent that floating sleeve 80 permits axial and even radial movability between inner and outer ducts 38 and 42 during operation and further permits the fabrication and assembly of inner and outer cases 38, 42 and 44 without critical regard for axial dimensioning since such will be compensated for by the axial movability permitted between floating sleeve 80 and inner duct 38 and between the sections of inner case 38 and 98 due to the presence of floating sleeve 80.

Since the space 100 between the compressor and inner wall 38 of bypass passage 24 is vented by means of passages 101, there is little if any pressure differential between this space and duct 24. Manufacturing clearances between surfaces 74 and 76 and 72 and 78, respectively, do not produce any leakage problem.

While a turbofan engine has been used to illustrate an environment for my invention, it should be borne in mind that it is equally applicable to any type of bypass engine including the turbo-ramjet.

It is to be understood that the invention is not limited to the specific embodiment herein illustrated and described but may be used in other ways without departure from its spirit as defined by the following claims.

I claim:

1. A bypass engine having an axis and a bypass ducting structure comprising an outer case of circular cross section concentric about said engine axis and comprising a plurality of abutting and solidly joined case sections including a frusto-conical portion, an inner case of circular cross section concentric with and enveloped by said outer case and cooperating therewith to form an annular bypass passage and comprising a rigid case including a frusto-conical portion radially aligned with the frusto-conical portion of said outer case to form a frusto-conical annular passage therebetween, said frusto-conical portion of said inner case being interrupted and presenting axially and radially spaced cylindrical end surfaces and axially and radially spaced radially extending end surfaces, and a floating sleeve of frusto-conical shape having axially and radially spaced cylindrical end surfaces mating with and received for axial and radial movement by said cylindrical end surfaces of said inner case frusto-conical portion and further having axially and radially spaced radially extending end surfaces cooperating with said frusto-conical portion radially extending end surfaces to define the limits of axial movement of said sleeve, said sleeve being supported solely by said frusto-conical portion cylindrical end surfaces and therefor being free to move and expand radially and axially.

2. In a turbofan engine having an axis and a fan, a compressor, a burner, and a turbine in axial alignment and concentric about said axis, an inner case of circular cross section concentric about said axis and enveloping said compressor, burner and turbine and comprising a plurality of abutting and solidly joined case sections including a frusto-conical portion, an outer case of circular cross section concentric with and enveloping said fan and said inner case and cooperating with said inner case to form an annular bypass passage communicating with said fan to receive cool air therefrom and bypassing said compressor, burner and turbine, said outer case comprising a rigid case including a frusto-conical portion radially aligned with the frusto-conical portion of said inner case to form a frusto-conical annular passage therebetween, means to regulate the axial dimension of said outer case, said frusto-conical portion of said inner case being interrupted and presenting axially and radially spaced cylindrical end surfaces and axially and radially spaced radially extending end surfaces, and a floating sleeve of frusto-conical shape with axially and radially spaced cylindrical end surfaces mating with and received for axial and radial movement with said cylindrical end surfaces of said inner case frusto-conical portion and further having axially and radially spaced radially extending end surfaces cooperating with said frusto-conical portion radially extending end surfaces to define the limits of axial movement of said sleeve, said sleeve being supported solely by said frusto-conical portion cylindrical end surfaces and therefor being free to move and expand radially and axially.

3. In a turbofan engine having an axis and a fan, a compressor, a burner and a turbine in axial alignment and concentric about said axis, an inner case of circular cross section concentric about said axis and enveloping said ompressor, burner and turbine and comprising a plurality of abutting and solidly joined case sections including a frusto-conical portion, an outer case of circular cross section concentric with and enveloping said fan and said inner case and cooperating with said inner case to form an annular bypass passage communicating with said fan to receive cool air therefrom and bypassing said compressor, burner and turbine, said outer case comprising a rigid case including a frusto-conical portion radially aligned with the frusto-conical portion of said inner case to form a frusto-conical annular passage therebetween, means to regulate the axial dimension of said outer case, said frusto-conical portion of said inner case being interrupted and presenting axially and radially spaced cylindrical end surfaces and axially and radially spaced radially extending end surfaces, a floating sleeve of frusto-conical shape with axially and radially spaced cylindrical end surfaces mating with and received for axial, radial and circumferential movement with said cylindrical end surfaces of said inner case frusto-conical portion, said sleeve being supported solely by said frusto-conical portion cylindrical end surfaces and therefor being free to move and expand radially, axially, and circumferentially, means to limit axial movement between said floating sleeve and said inner case, and means to equalize the pressure on opposite radial sides of said sleeve.

References Cited in the file of this patent

UNITED STATES PATENTS

| 2,555,965 | Garber | June 5, 1951 |
| 2,722,801 | Lombard | Nov. 8, 1955 |
| 2,798,360 | Hazen et al. | July 9, 1957 |